United States Patent
Im et al.

(10) Patent No.: US 8,303,750 B2
(45) Date of Patent: Nov. 6, 2012

(54) MANUFACTURING METHOD OF AIR MAT (75) Inventors: Dong-Gyu Im, Gyeonggi-do (KR); Gin-Kyu Choi, Gyeonggi-do (KR)

(73) Assignee: Ceragem Co., Ltd (KR)

( * ) Notice: Subject to any disclaimer, the term of this patent is extended or adjusted under 35 U.S.C. 154(b) by 61 days.

(21) Appl. No.: 12/676,116

(22) PCT Filed: Sep. 14, 2007

(86) PCT No.: PCT/KR2007/004443
§ 371 (c)(1),
(2), (4) Date: Jun. 21, 2010

(87) PCT Pub. No.: WO2009/031725
PCT Pub. Date: Mar. 12, 2009

(65) Prior Publication Data
US 2010/0243143 A1 Sep. 30, 2010

(30) Foreign Application Priority Data

Sep. 4, 2007 (KR) ........................ 10-2007-0089479

(51) Int. Cl.
*B32B 37/04* (2006.01)
*A47C 27/08* (2006.01)

(52) U.S. Cl. .......... 156/245; 156/74; 156/145; 156/292; 264/302; 264/310; 5/706

(58) Field of Classification Search ................. 156/74, 156/145, 146, 147; 5/707; *B32B 37/04*
See application file for complete search history.

(56) References Cited

U.S. PATENT DOCUMENTS

| 5,561,875 A | 10/1996 | Graebe |
| 2008/0196167 A1 | 8/2008 | Im et al. |
| 2008/0222433 A1 | 9/2008 | Kim |

FOREIGN PATENT DOCUMENTS

| JP | 09-207152 A | 8/1997 |
| KR | 10-2007-0024993 | 8/2007 |
| KR | 10-2007-0037887 | 9/2007 |
| WO | WO 2006132468 A1 * | 12/2006 |

* cited by examiner

*Primary Examiner* — William Bell
(74) *Attorney, Agent, or Firm* — Riverside Law LLP (57) ABSTRACT

The present invention relates to a method for manufacturing an air mat that reduces a thickness of a cushion part by means of both slush molding and rotational molding, enhances a bonding efficiency between a lower sheet and the cushion part, and obviates the need of any separate communicating members for forming the communicating passageways for a plurality of air pockets of the cushion part, thereby simplifying manufacturing processes.

3 Claims, 9 Drawing Sheets

MANUFACTURING METHOD OF AIR MAT

CROSS REFERENCE TO RELATED APPLICATION

The present application is a 35 U.S.C. §371 national phase application from, and claiming priority to, International Application PCT/KR2007/004443, filed Sep. 14, 2007, and published under PCT Article 21(2) in English, which claims priority to Korean Application No. 10-2007-0089479, filed Sep. 4, 2007, which applications are incorporated by reference herein in their entireties.

TECHNICAL FIELD

The present invention relates to a method for manufacturing an air mat that reduces a thickness of a cushion part by means of both slush molding and rotational molding, enhances a bonding efficiency between a lower sheet and the cushion part, and obviates the need of any separate communicating member for forming the communicating passageways for a plurality of air pockets of the cushion part, thereby simplifying manufacturing processes.

BACKGROUND ART

Generally, an air mat is an instrument that provides an appropriate cushion force through air pressure created by air injected into the inside thereof, so that a user can take a rest thereon comfortably. As such an air mat is convenient to carry and easily installed in every place, they are widely used.

Especially, recently, an air mat that-is widely used is provided with a plurality of embossing air pockets formed on a portion in contact with the human body so as to provide a finger-pressure effect to the user lying on the air mat and reduce unpleasant oppression against him or her.

Figure 1:
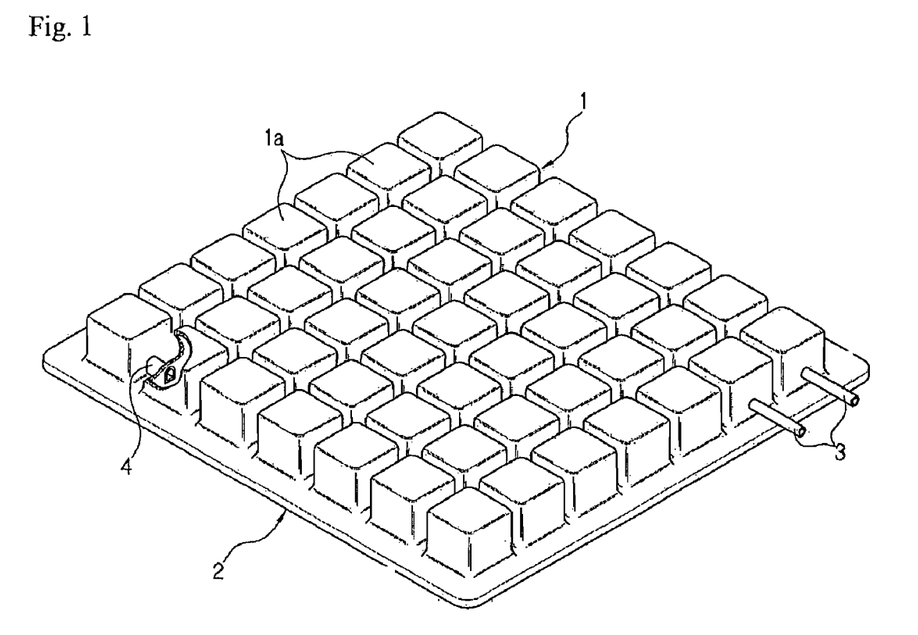
FIG. 1 is a perspective view showing a structure of an air mat made through a method for manufacturing an air mat according to the present invention.

As shown in FIG. 1, such a conventional air mat includes a cushion part 1 having a plurality of air pockets 1a arranged thereon, and a lower sheet 2 adapted to be bonded to the lower surface of the cushion part 1, for hermetically seal the lower portion of the cushion part 1.

Further, at one side of the cushion part 1 or the lower sheet 2 are provided air injection ports 3 for injecting air to the inside of the plurality of air pockets 1a.

Moreover, each of the plurality of air pockets 1a communicates with the adjacent air pocket 1a by means of a communicating passageway 4, so that the air injected through the air injection ports 3 is supplied to the plurality of air pockets 1a through the communicating passageways 4.

Such a conventional air mat has generally been made by means of slush molding in such a manner that plastic resin (hereinafter, referred to as 'plastic sol') is first filled into a mold for forming the cushion part and is then preheated therein to a predetermined temperature. After that, when the plastic resin is partially coated to a predetermined thickness on the inner surface of the mold, the filled plastic resin is externally poured out of the mold, and the resin layer coated to the predetermined thickness is completely gelled and cooled, thereby primarily finishing the cushion part of the air mat.

Next, a plurality of communicating passageways are formed for allowing the plurality of air pockets formed in the cushion part to communicate with one another, and the lower sheet that has been previously made is then bonded to the lower surface of the cushion part, thereby finishing the whole structure of the air mat.

By the way, at the time of molding the cushion part, the conventional manufacturing method of the air mat using the slush molding is carried out in a state where the mold is opened at the upper portion thereof according to the characteristics of the slush molding, such that only after the cushion part is completely molded, the lower sheet can be bonded to the cushion part.

As a result, after the bonding process of the lower sheet and the cushion part are separately carried out, the air mat can be finally made.

More specifically, the bonding process of the lower sheet and the cushion part is conducted by means of high-frequency bonding or adhesive bonding. First, in case of the high-frequency bonding, a high-frequency bonding machine should be separately provided, and also, a relatively long time of period for the bonding process is necessary, such that the whole manufacturing processes are delayed, thereby raising the product costs undesirably.

Specifically, in case of the adhesive bonding, a relatively long time of period for the bonding process is necessary in the same manner as the high-frequency bonding, and since the bonding is mostly made by manual operations, it is difficult to provide the firm bonding of the lower sheet and the cushion part, which results in a low quality of bonding results.

If the plastic sol is removed from the mold according to the characteristics of the slush molding, lots of scraps remain irregularly on the surfaces of the respective air pockets into the mold.

Therefore, the air pockets do not have uniform thicknesses by the formation of the scraps thereon, so that they may be partially broken by the application of external pressures while in use.

Also, the plurality of communicating passageways should be formed for allowing the adjacent air pockets of the cushion part to communicate with each other, such that air can be gently supplied to each of the plurality of air pockets.

However, when the slush molding is adopted to mold the cushion part of the air mat, the shape of the cushion part after the molding is very simple, so that the communicating passageways should be made through a separate communicating passageway-forming process after the cushion part has been completely molded. Thus, the whole manufacturing processes are undesirably delayed and the product costs are accordingly raised.

Of course, a through-hole may be formed by cutting the partition between the adjacent air pockets into the mold, thereby also forming the plurality of communicating passageways.

In the same manner as mentioned above, however, lots of scraps are formed in the inner walls of the communicating passageways in the molding process thereof, which causes the communicating passageways to be irregular in thickness, thereby making them easily broken.

In order to solve these problems that the manufacturing method of the air mat by means of slush molding has had, thus, there has been proposed Korean Patent 25 Application No. 2005-0093038 entitled 'an air mat and method for manufacturing and device of molding the same', as filed by the same applicant as in this invention.

The prior art air mat manufacturing method is conducted not by means of slush molding but by means of rotational molding, wherein plastic sol is first poured into a mold and after a lower sheet and a cover are coupled to each other, the mold is rotated in a predetermined direction, so that the plastic sol is uniformly distributed in the mold by the centrifugal force during the rotation, thereby forming the cushion part, and at the same time, it is moved to the lower sheet, thereby smoothly bonding the lower sheet and the cushion part.

Therefore, the manufacturing method of the air mat using the rotational molding can overcome the problem that the cushion part and the lower sheet are separately bonded to each other in the slush molding, and at the same time, the bonding is carried out by the same material, thereby advantageously increasing the bonding force between the cushion part and the lower sheet.

However, this applicant has found that the following problems occurring when only the rotational molding is adopted.

First, the cushion part should be desirably formed thinly in thickness so as to be easily expanded and contracted, but according to the characteristics of the rotational molding, the manufacturing method of the air mat by means of the rotational molding fails to make the thickness of the cushion part relatively thin.

Further, it is difficult to make an article having a relatively small volume according to the characteristics of the rotational molding, thereby making it hard to mold the plurality of air pockets having substantially small volumes.

Additionally, separate communicating members should be formed in the mold so as to form the communicating passageways during the molding process, which causes unnecessary consumption of a material and undesirably increases the number of manufacturing processes.

DISCLOSURE OF INVENTION

Technical Problem

Accordingly, it is an object of the present invention to provide a method for manufacturing an air mat that is conducted by means of both slush molding and rotational molding, thereby removing the disadvantages of the slush molding and the rotational molding, while obtaining only advantages both of them have.

That is, first, another object of the present invention is to provide a method for manufacturing an air mat that can increase the cushion force of a cushion part, since the disadvantages of the rotational molding are removed to easily mold a plurality of air pockets Of the cushion part having a relatively small volume and to make the thickness of the cushion part relatively thin.

Second, still another object of the present invention is to provide a method for manufacturing an air mat that enhances the bonding force between the cushion part and a lower sheet, since the disadvantages of the slush mold are overcome to remove the scraps formed on the surfaces of the plurality of air pockets of the cushion part and on the surfaces of a plurality of communicating passageways, and at the same time, since the cushion part and the lower sheet are bonded to each other through the scraps.

Third, yet another object of the present invention is to provide a method for manufacturing an air mat that prevents the plurality of air pockets and the plurality of communicating passageways from being broken while in use, since the plurality of air pockets of the cushion part are made uniformly in thickness.

Fourth, still yet another object of the present invention is to provide a method for manufacturing an air mat that easily forms the plurality of communicating passageways, even though separate communicating members are not needed, so that unnecessary consumption of a material for the communicating members is prevented and the number of manufacturing processes is reduced.

Technical Solution

To achieve the above objects, there is provided a method for manufacturing an air mat formed in such a manner as to couple a cushion part having a plurality of air pockets formed therein for containing air at the insides thereof with a lower sheet disposed on the lower surface of the cushion part, the method comprising the steps of: preparing a lower mold having a plurality of air pocket-molding recesses each having a predetermined depth, for molding the cushion part, the lower sheet adapted to be coupled with the lower mold, and a cover adapted to be seated on the lower sheet; conducting a slush molding process by pouring a resin composition into the lower mold for molding the cushion part; coupling the lower sheet to the lower mold and mounting the cover on the lower sheet, for covering the entrances of the plurality of air pocket-molding recesses of the lower mold; and conducting a rotational molding process by rotating the lower mold coupled with the lower sheet and the cover thereon by means of a rotational molding machine, for bonding the cushion part and the lower sheet on the lower mold as an integral body.

Advantageous Effects

The present invention gives the following advantages:

First, the method for manufacturing an air mat of this invention enhances the bonding force between the cushion part and a lower sheet, since the scraps formed on the surfaces of the plurality of air pockets of the cushion part and on the surfaces of a plurality of communicating passageways are removed by conducting the rotational molding after the slush molding, and at the same time, since the cushion part and the lower sheet are bonded integrally to each other through the scraps.

Second, the method for manufacturing an air mat of this invention prevents the plurality of air pockets and the plurality of communicating passageways from being broken while in use, since the plurality of air pockets of the cushion part are made uniformly in thickness by removing the scraps through the rotational molding after the slush molding.

Third, the method for manufacturing an air mat of this invention does not need any separate communicating member by molding the cushion part through slush molding before the rotational molding, thereby preventing unnecessary consumption of a material for the communicating members and reducing the number of manufacturing processes for mounting the communicating members.

Fourth, the method for manufacturing an air mat of this invention increases the cushion force of the cushion part, since the plurality of air pockets of the cushion part are made thinner in thickness when compared to the rotational molding by molding the cushion part through the slush molding before the rotational molding.

BRIEF DESCRIPTION OF THE DRAWINGS

FIGS. 4 to 7 are sectional views showing a slush molding procedure in the method for manufacturing an air mat according to the present invention, wherein FIGS. 9 to 11 are views showing a rotational molding process in the method for manufacturing an air mat according to the present invention, wherein

EXPLANATIONS ON THE REFERENCE NUMERALS OF MAIN PARTS IN THE DRAWINGS

10: lower mold 20: lower sheet
S: scrap 40: resin composition
30: cover 100: cushion part layer
200: communicating passageway layer
1000: cushion part
2000: air mat
S100: process for preparing mold, lower sheet and cover
S200: slush molding process
S300: lower sheet and cover-mounting process
S400: rotational molding process

BEST MODE FOR CARRYING OUT THE INVENTION

Figure 2:
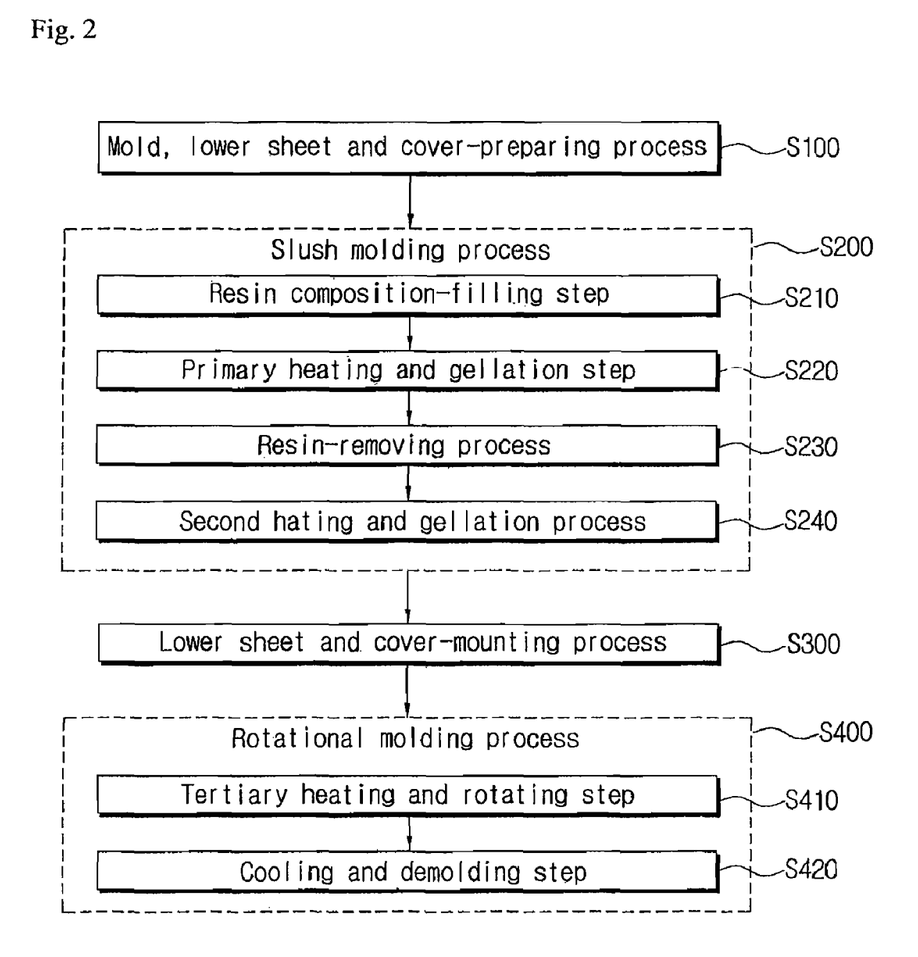
FIG. 2 is a flow chart showing the method for manufacturing an air mat according to the present invention.

To accomplish the above-mentioned objects, according to the present invention, as shown in FIG. 2, there is provided a method for manufacturing an air mat basically including the steps of conducting a lower mold and a lower sheet-preparing process S100 by preparing a lower mold and a lower sheet; conducting a slush molding process S200 by molding a cushion part in the prepared lower mold by means of slush molding; conducting a lower sheet and cover-mounting process S300 by mounting the lower sheet and a cover on the lower mold having the cushion part molded therein through the slush molding; and conducting a rotational molding process S400 by bonding the lower sheet mounted on the lower mold and the cushion part by means of rotational molding.

Figure 3:
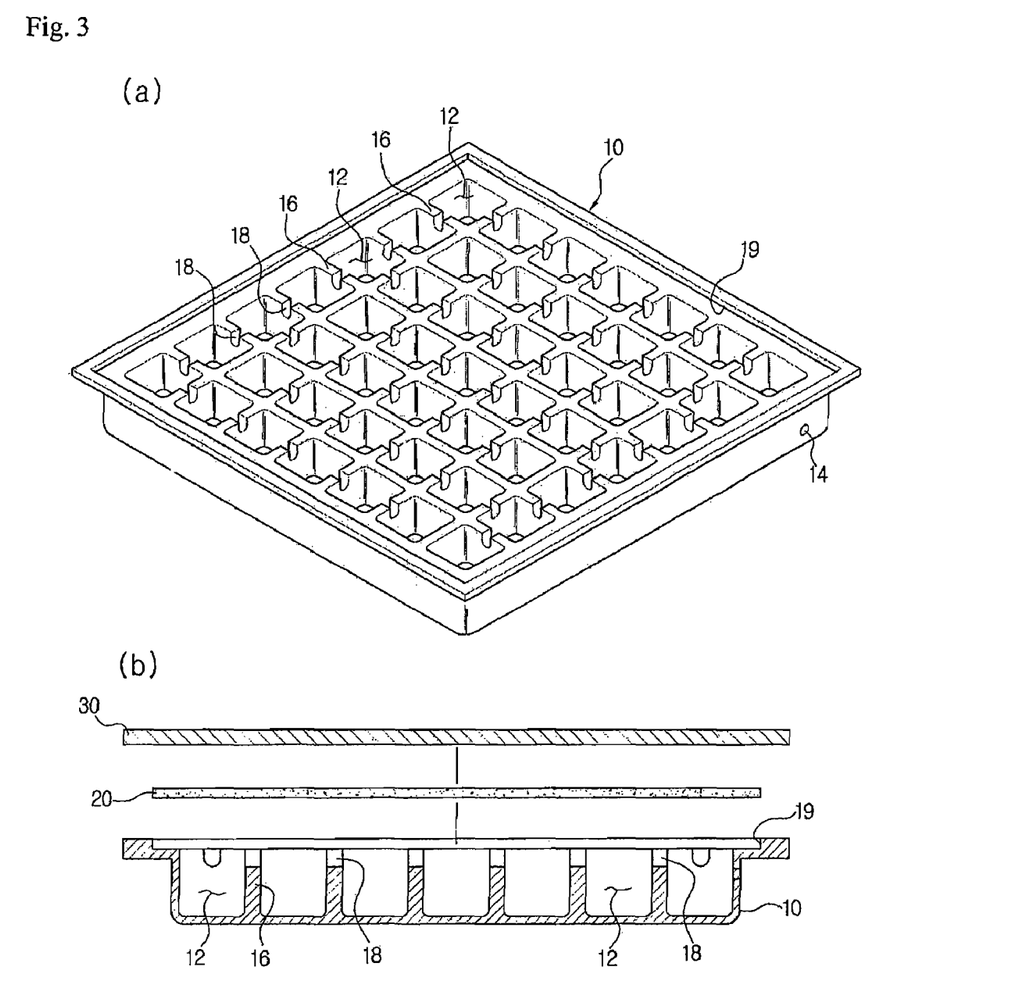
FIGS. 3a and 3b are sectional views showing processes for preparing a mold, a lower sheet, and a cover in the method for manufacturing an air mat according to the present invention.

First, as shown in FIGS. 3a and 3b, the process S100 for preparing the mold and the lower sheet is the step of preparing a lower mold 10 adapted to mold the cushion part of the air mat, a lower sheet 20 adapted to become the bottom portion of the air mat, and a cover 30 adapted to fix the lower mold 10 in the rotational molding process.

At this time, as shown in the drawings, the lower mold 10 is provided with a plurality of air pocket-molding recesses 12 each having a predetermined depth, for molding a plurality of air pockets on the air mat, and at least one or more air pocket-molding recesses 12 has an air injection port 14 communicating with the outside.

The plurality of air pocket-molding recesses 12 are spaced equally apart from one another, while having a partition 16 formed between the adjacent air pocket-molding recesses 12, and each of the partitions 16 has a cut groove 18 formed for molding a communicating passageway adapted to make each air pocket communicate with the adjacent air pocket.

The cut groove 18 is adapted to mold the communicating passageways for making the air pockets communicate with one another in the cushion part-molding process.

If the air mat is molded to a structure where air is supplied to each air pocket, there is no need for the formation of the cut groove 18, but if air is evenly supplied to the entire air pockets at one time, the cut grooves 18 are formed on the partitions 16.

Further, the lower mold 10 has a stepped portion 19 formed along the four sides of the top surface thereof, for mounting the lower sheet 20 as will be discussed later thereon.

The lower sheet 20 that is prepared together with the lower mold 10 is adapted to become the bottom portion of the air mat and has the same area as the top surface of the lower mold 10, that is, the area within the stepped portion 19.

The cover 30 is adapted to fix the lower sheet 20 to the lower mold 10 during the molding process and is of a sheet-like shape like the lower sheet 20, while having a larger area than the top surface of the lower mold 10.

If the lower mold 10, the lower sheet 20, and the cover 30 are all prepared, the slush molding process S200 is first carried out, as shown in FIG. 2.

The slush molding process S200 is divided into a resin composition-filling step S210, a primary heating and gellation step S220, a resin composition-removing step S230, and a secondary heating and gellation step S240.

Figure 4:
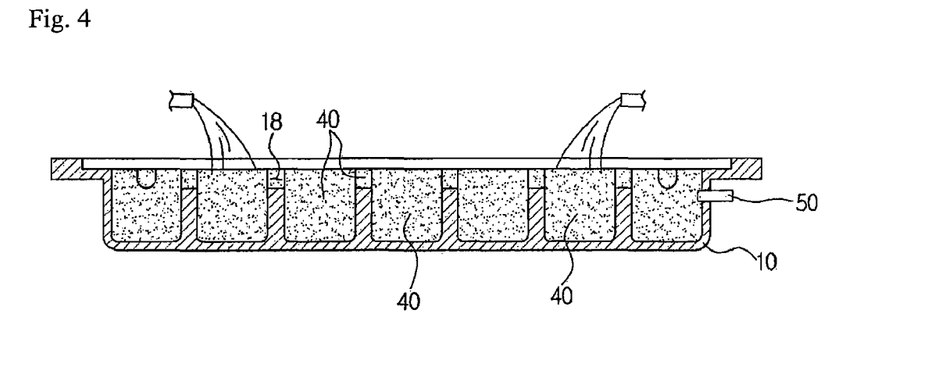
FIG. 4 is a sectional view showing a state where a resin composition is filled into a mold through a resin composition-filling step.

First, as shown in FIG. 4, the resin composition-filling step S210 of the slush molding process S200 is the step of filling a resin composition 40, that is, plastic sol, into the cut grooves 18 inclusive of the air pocket-molding recesses 12 in the lower mold 10, for molding the plurality of air pockets and the plurality of communicating passageways.

The resin composition 40 used at this time is made of a material used in a general air mat like a PVC (poly vinyl chloride) material, synthetic rubber, or a polyurethane material, and thus, powder type basic synthetic resin selected among them is mixed with a plasticizer adapted to increase the thermoplasticity of the basic synthetic resin to mold it well at a high temperature.

The basic synthetic resin is used mainly with the PVC material that is thermally processed with ease, but other materials may be of course selected.

Also, the plasticizer is selectively used according to the kinds of basic synthetic resin, preferably, with a phthalate plasticizer like Diisononyl phthalate (DINP), di-n-octyl phthalate (DNOP), or Diisodecyl phthalate (DIDP) having relatively less contents of carcinogens or environmental hormones.

In other words, as the regulations for the environmental hormones in the usage of the synthetic resin are strengthened, only non-toxic plasticizer can be used.

If separate pigments are added to the resin composition 40, the air mat 200 having desired colors can be manufactured.

The method for filling the resin composition 40 includes a single-filling method wherein the resin composition 40 is filled into the air pocket-molding recesses 12 and the cut grooves 18 at one time, and a two times-filling method wherein the resin composition 40 is coated on the inner wall surfaces of the air pocket-molding recesses 12 and the cut grooves 18 to form a relatively thin film and is then filled therein.

In a case where the irregular surfaces are formed on the surface of the mold or in a case where bubbles are contained in the resin composition itself, the two times-filling method is preferable, but in a case where the shape to be molded is simple like the air pocket-molding recesses 12, the single-filling method is more desirable.

Meanwhile, before the resin composition 40 is poured into the lower mold 10 a separate molding bar 50 is fitted to an air supply part formed in the lower mold 10, thereby preventing the resin composition 40 from flowing to the outside and also forming an air injection port 14 in the molding process of the cushion part of the air mat.

If the air injection port 14 is not formed in the lower mold 10, it may be simply formed at a given position after the air mat is completely manufactured, and therefore, the process of mounting the molding bar 50 is selectively adopted.

If the resin composition-filling step S210 is finished, the primary heating and gellation step S220 is carried out.

Figure 5:
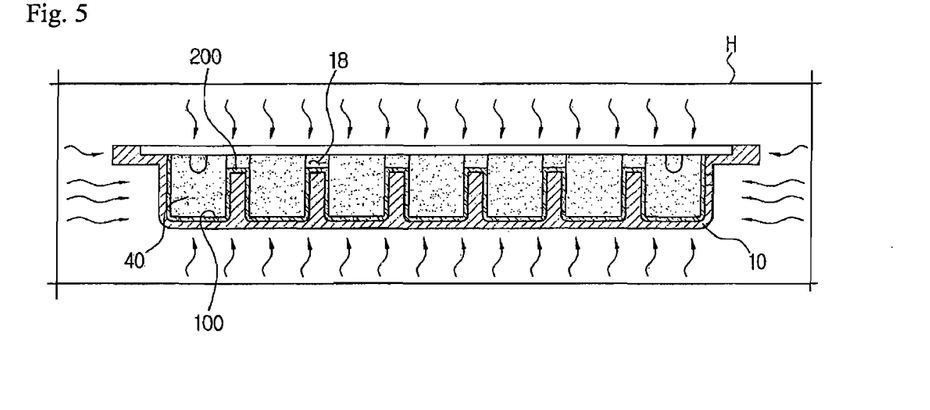
FIG. 5 is a sectional view showing a state where a cushion part layer and a communicating passageway layer are formed to a predetermined thickness in the mold through primary heating and gellation steps.

In the primary heating and gellation step S220, as shown in FIG. 5, the resin composition 40 in the air pocket-molding recesses 12 is partially hardened by means of heating, thereby forming the plurality of air pockets at the inner walls of the air pocket-molding recesses 12 and the plurality of communicating passageways at the inner walls of the cut grooves 18 to a predetermined thickness.

The process is carried out wherein the lower mold 10 is put in a separate oven H at a temperature in a range between 160° C. and 220° C. for about 5 to 6 minutes.

At this time, the heating temperature and time are variously determined in accordance with the thickness of the product to be molded. That is, if the product to be molded is relatively thick, the heating temperature and time is increased, and contrarily, if the product to be molded is relatively thin, it is decreased.

If the primary heating step is finished, the primary gellation step is carried out wherein the inner walls of the air pocket-molding recesses 12 and the inner walls of the cut grooves 18 are high at their density to a predetermined thickness, thereby forming the cushion part layers 100 and the communicating passageway layers 200 being in an unstable tissue state.

If the primary heating and gellation step S220 is finished, the resin composition-removing step S230 is carried out.

The resin composition-removing step S230 is the step of discharging the plastic sol in the mold, that is, the resin composition that is not gelled therein, to the outside, and the discharged resin composition is reusable through a separate vacuum pump.

Figure 6:
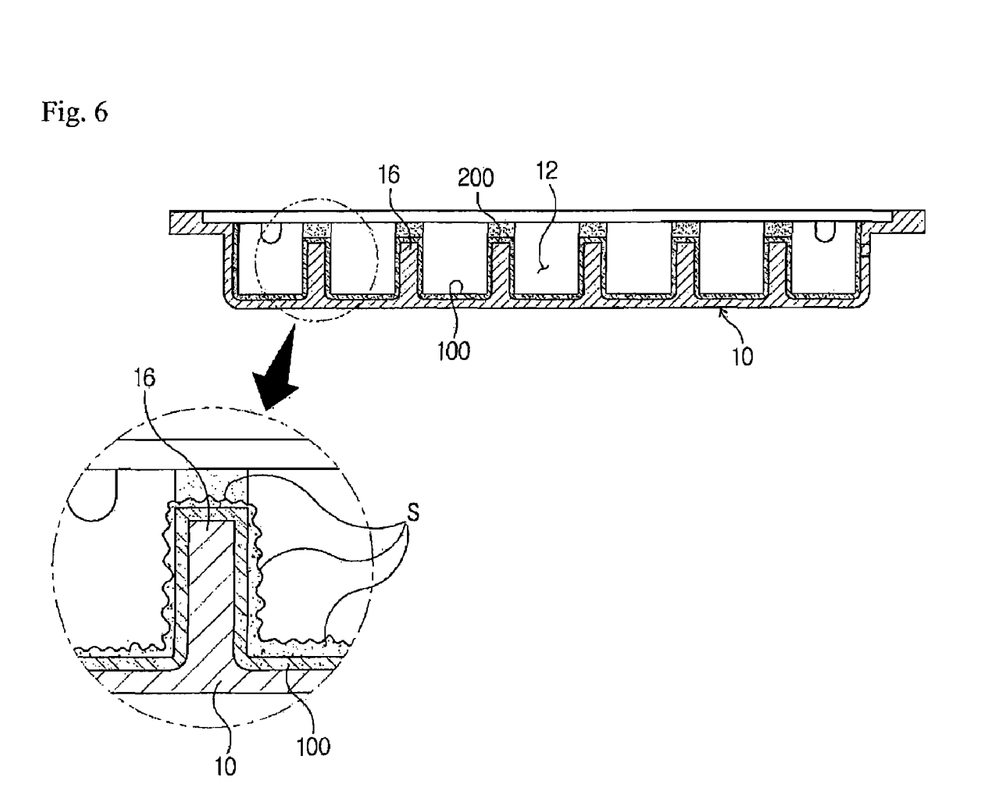
FIG. 6 is a sectional view showing a state where the cushion part layer and the communicating passageway layer remain after the resin in the mold is removed through a resin composition-removing step.

If the resin composition is removed from the mold, the primarily gelled cushion part layers 100 and communicating passageway layers 200 remain on the surfaces of the air pocket-molding recesses 12 and on the surfaces of the cut grooves 18, as shown in FIG. 6.

The cushion part layers 100 and the communicating passageway layers 200 are opened at their top portion thereof, and the communicating passageway layers 200 formed on the cut grooves 18 are adapted to connect the plurality of cushion part layers 100 to one another.

By the way, as shown in FIG. 6, after the removal the resin composition S (hereinafter, referred to as 'scraps') still remains irregularly on the surfaces of the cushion part layers 100 and the communicating passageway layers 200.

As noted above, the scraps S cause the thicknesses of the air pockets and the communicating passageways to be irregular, which makes them easily broken. According to the present invention, however, the scraps S are removed and at the same time are used as an adhesive material for bonding the cushion part and the lower sheet to each other.

This process will be discussed in the rotational molding process S400 as will be explained later.

Since the primarily gelled cushion part layers 100 and communicating passageway layers 200 do not have relatively high viscosity, next, the secondary heating and gellation step S240 is carried out.

Figure 7:
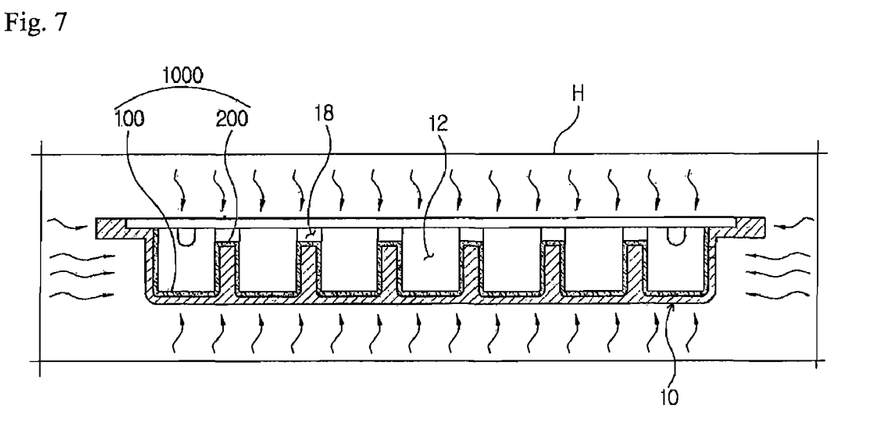
FIG. 7 is a sectional view showing a cushion part-finishing process through secondary heating and gellation step.

In the secondary heating and gellation step S240, the primarily gelled cushion part layers 100 and communicating passageway layers 200 are heated again and gelled to a predetermined temperature, thereby finishing the cushion part of the air mat. As shown in FIG. 7, the process is carried out wherein the lower mold 10 is put in the oven H at a temperature in a range between 180° C. and 230° C. for about 5 to 6 minutes.

At this time, heating means includes an electric heater or burner. In case of a burner, the flame from the burner does not abut against the mold, thereby preventing the generation of the cracks on the product to be molded.

In addition thereto, a separate heat medium like silicon oil, paraffin oil, potassium mitrate and so on abuts against the mold so as to heat the mold at a temperature of about 300° C. or more.

The second heated cushion part layers 100 and communicating passageway layers 200 are raised again at their viscosity, thereby forming the final cushion part 100.

Like this, the communicating passageways as well as the air pockets are formed by means of the slush molding, so that the communicating passageway members necessarily needed for forming the communicating passageways in the rotational molding are not needed at all, thereby preventing unnecessary consumption of the material for the communicating passageway members and the delay in the process for mounting them.

Even though in the drawings, in the slush molding process S200, the lower mold 10 may be first preheated before the resin composition-filling step S210.

That is, in a state where the coating layer like paraffin tube is formed on the inner surface of the lower mold 10 before the resin composition 40 is filled therein in the general slush molding, the lower mold 10 is heated after the resin composition 40 is filled, but in a state where the coating layer is not formed, the resin composition 40 may be filled after the lower mold 10 is preheated, which of course can conduct the gellation process.

If the primary heating and gellation step is carried out after the resin composition-filling step, further, the secondary heating and gellation step S240 is necessarily conducted, but it can be avoided if the resin composition 40 is filled after the lower mold 10 is heated.

In more detail, if the resin composition is filled at the state where the lower mold is fully heated, the resin composition is fully gelled at short time period in the primary gellation step, so that there is no need for the time for raising the lower mold to a predetermined temperature for the gellation.

If the molding for the cushion part 1000 is finished through the slush molding process S200, next, the rotational molding process S400 is carried out before the molded product is demolded from the lower mold 10 (see FIG. 2).

The lower sheet and cover-mounting process S300 is first carried out before the rotational molding process S400.

Figure 8:
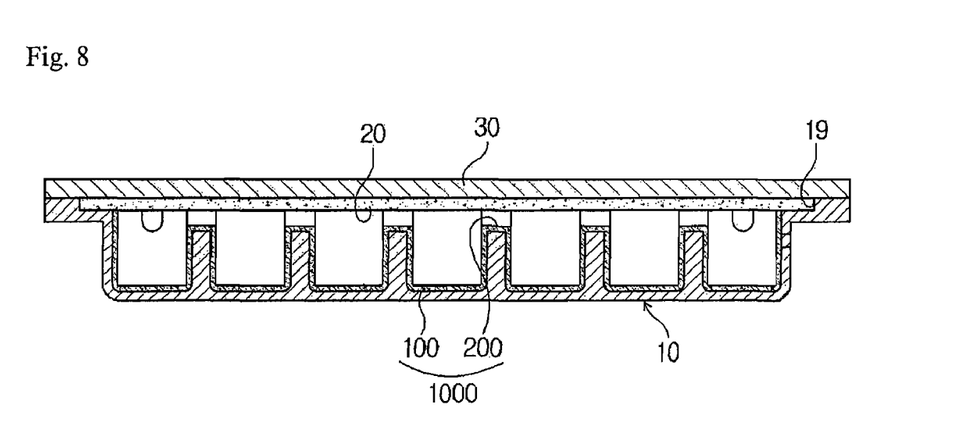
FIG. 8 is a sectional view showing a state where the lower sheet and the cover are sequentially covered on the upper portion of the mold through lower sheet and cover-mounting processes.

The lower sheet and cover-mounting process S300 is conducted wherein before the rotational molding process S400 the lower sheet 20 that becomes the bottom surface of the air mat is mounted on the lower mold 10 and at the same time the cover 30 is mounted on the lower sheet 20 for fixing the lower sheet 20, as shown in FIG. 8.

As mentioned above, the lower sheet 20 is mounted along the stepped portion 19 formed on the top portion of the lower mold 10, for covering the entrances of the air pocket-molding recesses 12.

At this time, the lower sheet 20 is formed of the same material as the cushion part 1000, so that it can be well formed integrally with the cushion part 1000 through the rotational molding process, thereby achieving more rigid bonding results between them.

If the lower sheet 20 is mounted, the cover 30 is disposed on the lower sheet 20. The cover 30 has a given weight capable of pressing the lower sheet 20 at a given pressure in such a manner as to fix the lower sheet 20, and at the same time, it completely closes the plurality of air pockets and the plurality of communicating passageways, thereby enhancing the bonding force between the lower sheet 20 and the cushion part 1000.

Moreover, the cover 30 is fixedly coupled on the lower sheet 20 by means of separate fastening means like bolts (not shown in the drawings), for preventing the deviation from the lower sheet 20.

After that, the rotational molding process S400 is carried out, which includes a tertiary heating and rotating step S410 and a cooling and demolding step S420.

The tertiary heating and rotating step S410 is a most important process in this invention, wherein the real bonding between the cushion part 1000 and the lower sheet 20 is achieved, thereby finally finishing the air mat of the invention.

Figure 9:
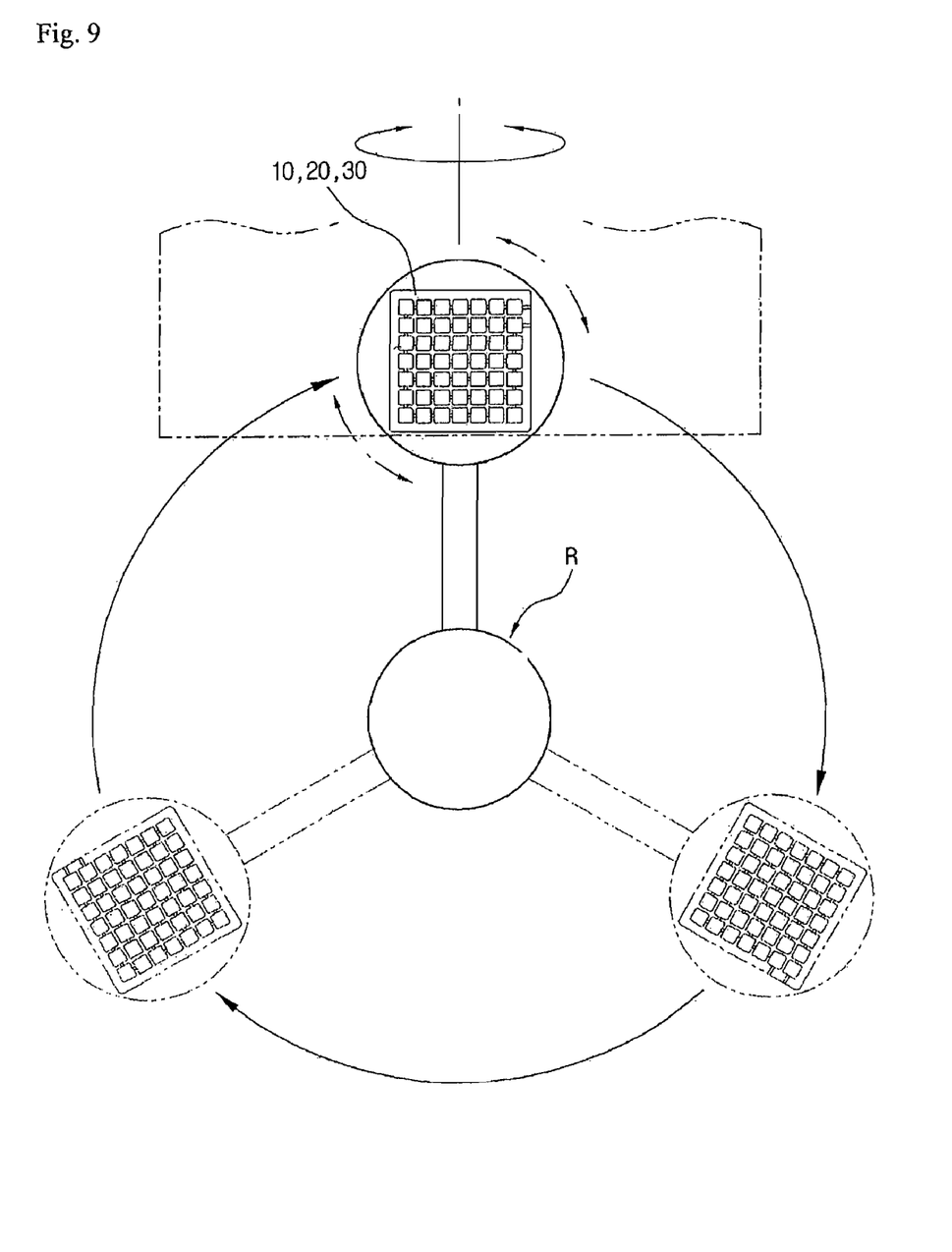
FIG. 9 is a view showing a rotational molding process through a rotation molding machine.

As shown in FIG. 9, first, the assembled body of the lower mold 10, the lower sheet 20 and the cover 30 is rotated to given several directions by means of a rotational molding machine R and at the same time is heated by means of a heating machine (which is not shown), thereby bonding the cushion part 1000 in the lower mold 10 and the lower sheet 20 to each other.

In the tertiary heating and rotating step S410 the lower mold 10 is put in the oven H at a temperature in a range between 200° C. and 260° C. for about 2 to 10 minutes.

Figure 10:
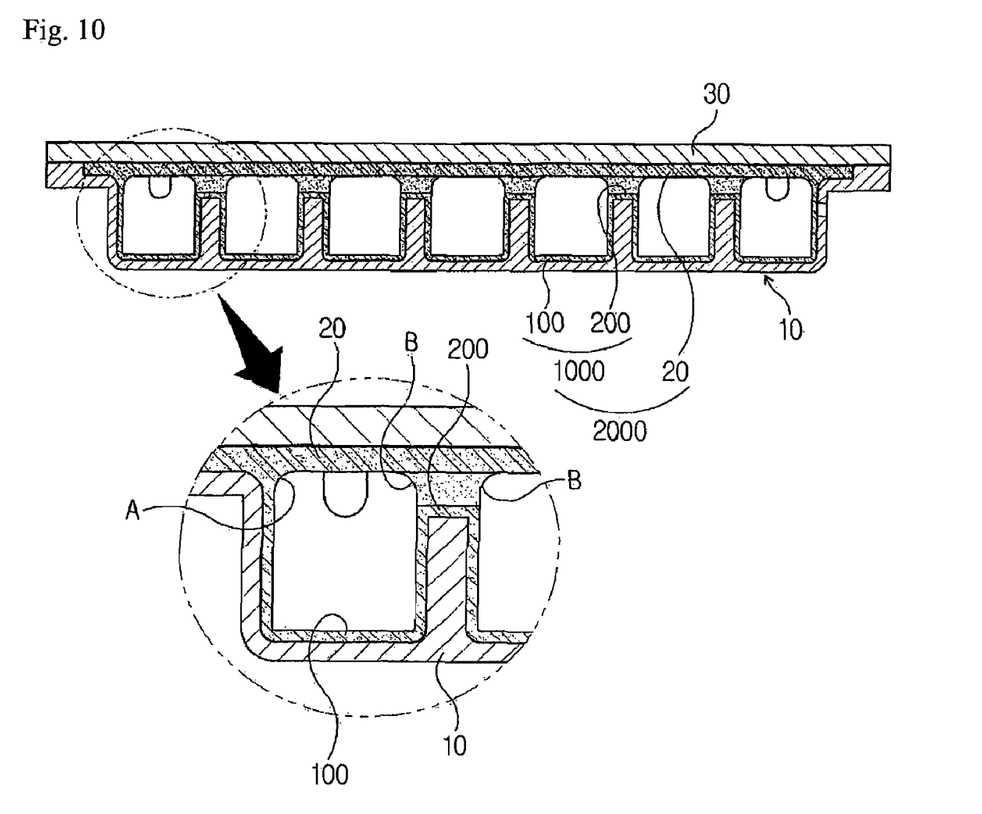
FIG. 10 is a sectional view showing a state where the cushion part and the lower sheet are bonded to each other through scraps in the rotational molding process.

While the tertiary heating is being conducted, as shown in FIG. 10, the scraps S remaining on the surfaces of the air pockets and communicating passageways are melted and evenly applied to the inner wall surfaces of the cushion part layers 100 and the communicating passageway layers 200 by the centrifugal force generated by the rotation of the rotational molding machine R in the rotational molding process conducted together with the tertiary heating.

In this process, also, the scraps S are applied to a connection portion A between the cushion part layers 100 and the lower sheet 20 and to a connection portion B between the communicating passageway layers 200 and the lower sheet 20, such that the cushion part layers 100, the lower sheet 20, and the communicating passageway layers 200 are bonded integrally to one another.

At this time, the cushion part 1000 and the lower sheet 20 are bonded to each other through the scraps S as the same material as each other, they are formed integrally with each other, thereby enhancing a bonding efficiency.

In this case, the application degree of the scraps S is determined upon the rotational speed of the lower mold 10, but it may be adjusted in accordance with the thicknesses of the lower mold 10 and the cover 30.

That is, if the lower mold 10 is thinner than the cover 30, it has a more rapid heat conduction efficiency than the cover 30 at the inner surface thereof in the rotational molding process, so that the heat conduction of the lower mold 10 becomes higher than that of the cover 30, which makes the scraps S in the lower mold 10 first melted, thereby achieving a high degree of application of the scraps S at a relatively short time period.

Of course, if the cover 30 is thinner than the lower mold 10, the degree of application of the scraps S has an opposite result to that mentioned above.

According to one of the features of the present invention, the scraps S formed during the slush molding are removed through the rotational molding, thereby preventing the thickness of the cushion part from being irregularly formed, and at the same time, they serve as the bonding material between the lower sheet 20 and the cushion part 1000, thereby obtaining a high bonding efficiency.

Even though the bubbles are contained in the resin composition itself in the resin composition-filling step during the slush molding process, they are removed in the scrap-applying process during the rotational molding process, thereby preventing the generation of the spots on the surface of the molded product.

As the cushion part and the lower sheet are formed integrally with each other, they are bonded with no separate bonding process, thereby making the production process of the air mat simple, reducing the process time and the product cost, and decreasing the number of the defective products.

According to one of the features of the present invention, further, since the cushion part is molded through the slush molding before the rotational molding, it is formed to a relatively thinner thickness when compared as through the rotational molding, thereby enhancing the cushion force of each air pocket.

Moreover, there is no need to mount the communicating passageway members for molding the communicating passageways necessarily needed upon the rotational molding, thereby preventing the consumption of materials for the communicating passageway members and the delay of the production processes.

That is, this invention adopts the advantages of the slush molding and the rotational molding and at the same time overcomes the disadvantages they have had.

Figure 11:
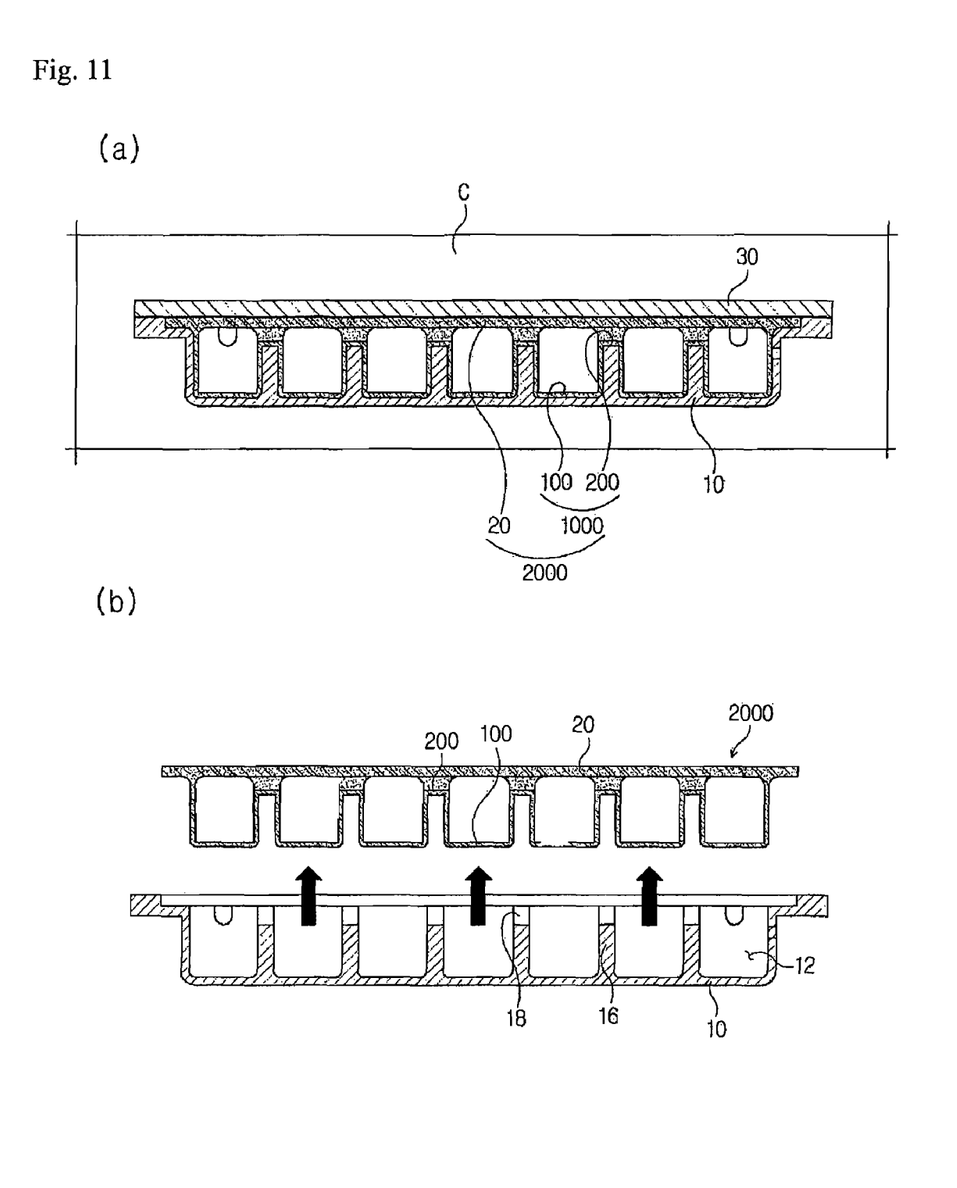
FIGS. 11a and 11b are sectional views showing a state where the air mat is finished through cooling and demolding steps.

After the tertiary heating and rotating step S410 is finished, all of the processes of this invention are finished through the cooling and demolding step S420. This process S420 is carried out wherein the lower mold is fully cooled through cooling water C, as shown in FIG. 11a, the water remaining on the surface of the lower mold is removed to demount the cover 30 from the lower sheet, and the molded product is demolded from the lower mold 10, as shown in FIG. 11b.

The molded product demolded from the lower mold 10 becomes the air mat 2000, as shown in FIG. 1, that is covered on the upper surfaces of the cushion part layers 100 and the communicating passageway layers 200 by means of the lower sheet 200, that is, has the cushion part layers 100, the communicating passageway layers 200, the lower sheet 20 as formed integrally with one another.

What is claimed is:

1. A method of manufacturing an air mat, wherein a cushion part having a plurality of air pockets formed therein for containing air at the insides thereof is coupled with a lower sheet disposed on the lower surface of said cushion part, said method comprising the steps of:

preparing a lower mold having a plurality of air pocket-molding recesses each having a given depth, for molding said cushion part; said lower sheet adapted to be coupled with said lower mold; and a cover adapted to be seated on the said sheet;

conducting a slush molding process by pouring a resin composition into said lower mold for molding said cushion part;

coupling said lower sheet to said lower mold and mounting said cover on said lower sheet, for covering the entrances of said plurality of air pocket-molding recesses of said lower mold; and, conducting a rotational molding process by rotating said lower mold coupled with said lower sheet and said cover thereon by means of a rotational molding machine, for bonding said cushion part and said lower sheet on said lower mold as an integral body, wherein during said rotational molding process scraps of said resin composition remaining on the surfaces of said plurality of air pockets of said cushion part in said lower mold are melted and partially diffused to said lower sheet, thereby bonding said cushion part and said lower sheet to each other.

2. A method of manufacturing an air mat, wherein a cushion part having a plurality of air pockets formed therein for containing air at the insides thereof is coupled with a lower sheet disposed on the lower surface of said cushion part, said method comprising the steps of:

preparing a lower mold having a plurality of air pocket-molding recesses each having a given depth, for molding said cushion part; said lower sheet adapted to be coupled with said lower mold; and a cover adapted to be seated on the said sheet;

conducting a slush molding process by pouring a resin composition into said lower mold for molding said cushion part;

coupling said lower sheet to said lower mold and mounting said cover on said lower sheet, for covering the entrances of said plurality of air pocket-molding recesses of said lower mold; and, conducting a rotational molding process by rotating said lower mold coupled with said lower sheet and said cover thereon by means of a rotational molding machine, for bonding said cushion part and said lower sheet on said lower mold as an integral body, wherein said slush molding process comprises the steps of:
   filling said resin composition into said lower mold;
   conducting a primary heating and gellation step by heating said lower mold to mold a cushion part layer on the inner surface of each of said plurality of air pocket-molding recesses of said lower mold;
   removing said resin composition which is not gelled in said lower mold; and,
   conducting a secondary heating and gellation step by re-heating said cushion part layer in said lower mold.

3. The method of claim 2, wherein said rotational molding process comprises:
   a tertiary heating and rotating step of heating said lower mold during the rotation of said lower mold; and,
   a cooling and demolding step of cooling said lower mold after said cushion part and said lower sheet are bonded to each other and demolding said cushion part and said lower sheet from said lower mold.

* * * * *